US012122536B2

(12) United States Patent  
Dehais et al.

(10) Patent No.: US 12,122,536 B2  
(45) Date of Patent: Oct. 22, 2024

(54) DEVICE FOR ATTACHING A LIFTING TOOL TO AN AIRCRAFT NACELLE THRUST REVERSER DOOR

(71) Applicant: Safran Nacelles, Gonfreville l'Orcher (FR)

(72) Inventors: Tony Dehais, Moissy Cramayel (FR); Vivien Lucienne, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 458 days.

(21) Appl. No.: 17/536,285

(22) Filed: Nov. 29, 2021

(65) Prior Publication Data

US 2022/0081128 A1 Mar. 17, 2022

Related U.S. Application Data

(63) Continuation of application No. PCT/FR2020/050796, filed on May 13, 2020.

(30) Foreign Application Priority Data

May 29, 2019 (FR) ...................................... 1905732

(51) Int. Cl.  
*B64F 5/50* (2017.01)

(52) U.S. Cl.  
CPC ...................... *B64F 5/50* (2017.01)

(58) Field of Classification Search  
CPC .................................. B64F 5/50; Y02T 50/60  
See application file for complete search history.

(56) References Cited

U.S. PATENT DOCUMENTS

| 3,154,206 | A | * | 10/1964 | Gillette, Jr. | ............. | B66C 23/48 |
| | | | | | | 254/2 R |
| 5,924,744 | A | * | 7/1999 | Eberle | ..................... | F16L 37/20 |
| | | | | | | 285/179 |
| 2013/0302083 | A1 | * | 11/2013 | Matignon | ................. | B64F 5/50 |
| | | | | | | 403/52 |

FOREIGN PATENT DOCUMENTS

KR 20140137828 12/2014

OTHER PUBLICATIONS

International Search Report for International Application PCT/FR2020/050796, mailed Oct. 7, 2020.

* cited by examiner

*Primary Examiner* — Lawrence Averick  
(74) *Attorney, Agent, or Firm* — Burris Law, PLLC

(57) ABSTRACT

A device for fixing a lifting tooling on an aircraft component includes a threaded screw, a hollow body, an orientation and positioning system, and a retraction system. The threaded screw has a longitudinal axis and includes a distal end having a screw head. The threaded screw further includes a threaded proximal end and an intermediate part. The hollow body houses the threaded screw while allowing the rotation of the threaded screw along its longitudinal axis. The orientation and positioning system is configured to allow rotation of the threaded screw about axes transverse to the longitudinal axis of the threaded screw, and translation of the threaded screw parallel to its longitudinal axis. The retraction system is configured to retract the threaded proximal end of the threaded screw in the hollow body.

16 Claims, 4 Drawing Sheets

DEVICE FOR ATTACHING A LIFTING TOOL TO AN AIRCRAFT NACELLE THRUST REVERSER DOOR

CROSS-REFERENCE TO RELATED APPLICATIONS

This application is a continuation of International Application No. PCT/FR2020/050796, filed on May 13, 2020, which claims priority to and the benefit of FR 19/05732 filed on May 29, 2019. The disclosures of the above applications are incorporated herein by reference.

FIELD

The present disclosure relates to a device for fixing a lifting tooling for an aircraft nacelle thrust reverser door and more particularly to an interface screw for a thrust reverser door lifting tooling.

BACKGROUND

The statements in this section merely provide background information related to the present disclosure and may not constitute prior art.

An aircraft is moved by at least one propulsion unit including a turbojet engine housed in a nacelle generally having a tubular structure comprising an air inlet in front of the turbojet engine, a middle section configured to surround a fan of the turbojet engine, a rear section configured to surround the combustion chamber of the turbojet engine and may accommodate thrust reverser means or a thrust reverser.

A thrust reverser comprises movable thrust reverser elements, generally two movable thrust reverser elements, carried by the nacelle to be displaced between a closed position (direct jet) in which the thrust reverser is inactive, and an open position (reverse jet) in which the thrust reverser is active, that is to say it returns at least part of the gas flow generated by the turbojet engine in the direction opposite to the guided flow by the nacelle. In the reverse jet position, the thrust reverser returns at least part of the gas flow generated by the turbojet engine in the reverse direction to the flow guided by the nacelle.

In one thrust reversal type, the movable reversing elements are doors.

When the doors are assembled on a thrust reverser, or when they are disassembled for maintenance, the doors are handled by means of tooling making it possible to support and manipulate the doors. This is about lifting tooling.

Such tooling generally has a metal frame having at least three fixing points to the door. Each fixing point includes a threaded screw configured to be screwed into a orifice arranged on the door so as to be able to be adapted to doors having different shapes and sizes, and therefore openings at different locations. Each threaded screw advantageously has a system of orientation of the threaded screw, thanks to a system of ball joints at the level of the link between the screw and the tooling.

When approaching the tooling of the door, the threaded end of the screws are configured to be introduced into an orifice in the door, which risks damaging the door when it comes into contact with it.

SUMMARY

This section provides a general summary of the disclosure and is not a comprehensive disclosure of its full scope or all of its features.

The present disclosure provides a device that protects the door from the threaded end of the screws of a lifting tooling.

The present disclosure provides a device for fixing a lifting tooling on an aircraft component such as a nacelle thrust reverser door. The device comprises a threaded screw, a hollow body, an orientation and positioning system, and a retraction system. The threaded screw has a longitudinal axis and includes a distal end having a screw head, a threaded proximal end and an intermediate part. The hollow body houses the threaded screw while allowing the rotation of the threaded screw along its longitudinal axis. The orientation and positioning system of the threaded screw allows the rotation of the screw around axes transverse to the longitudinal axis of the threaded screw, and the translation of the screw parallel to its longitudinal axis.

Thus, the threaded screw is retractable in the body so that its threaded part is able to be disposed inside the body when the lifting tooling is approached from the door, and projects from the body when the tooling is positioned on the door. The door is therefore protected from the threaded part of the screw when approaching the tooling of the door.

Although the present disclosure is described with regard to lifting tooling for a thrust reverser door, it is not limited to that. That is, the device of the present disclosure may be suitable for fixing a lifting tooling on any other element such as for example a motor, or even for fixing any handling or support tooling on an element of an aircraft.

The device according to the present disclosure therefore makes it possible both to modify the orientation and the positioning of the screw and to protect the door from the threaded part of the screw when approaching the tooling. Modifying the orientation and positioning of the screw makes it possible to adapt the lifting tooling to doors of different sizes and shapes, the positions of the interface points being different from one door to another.

In one form, the proximal end of the threaded screw is its end configured to be introduced into an orifice in the door.

In another form, the device of the present disclosure includes one or more of the following optional characteristics considered alone or according to all possible combinations.

In one form, the retraction system includes a spring and a spacer. The spring being arranged between the hollow body and the screw head. The spring bearing by its proximal end on the hollow body and by its distal end on the screw head via the spacer. The spacer having a shape allowing the connection between the screw head and the orientation and positioning system of the screw when the screw projects into an orifice of the door.

In another form, the spring allows pushing back the spacer and therefore the screw head, so that the threaded end of the screw is placed inside the body. When the device according to the present disclosure is positioned in contact with an orifice in the door into which it is configured to be introduced, the spring is able to be compressed by applying a rotational force around the longitudinal axis of the screw, manually or using a fixing key, on the screw head, allowing the threaded end to be inserted into the orifice.

In yet another form, the system for orienting and positioning the threaded screw includes a tubular element and a system of ball joints. The tubular element includes a proximal end with an oblong transverse bore in which the threaded screw is inserted and a distal end configured to be fixed to the lifting tooling. The system of ball joints are placed in contact with the hollow body and the outer walls of the oblong transverse bore of the tubular element.

In one form, the outer diameter of the hollow body is less than the diameter of the oblong transverse bore, so that a clearance is present between the inner wall of the oblong transverse bore and the hollow body inserted into the transverse oblong bore. Thus, the positioning of the screw is adjustable. That is, the screw is able to translate in any direction perpendicular to its longitudinal axis, until the hollow body is in contact with the inner wall of the bore.

In another form, the ball joint system comprises at least a pair of convex and concave washers.

In yet another form, the ball joint system is disposed in contact with the outer walls of the oblong transverse bore of the tubular element and of the hollow body so that the screw can pivot on itself and about any axis transverse to its longitudinal axis.

In one form, the ball joint system comprises a proximal pair of convex and concave washers, and a distal pair of convex and concave washers. Each pair being disposed in contact with the outer walls of the oblong transverse bore of the tubular element and of the hollow body, on each side of the oblong transverse bore of the tubular element. Thus, the position and orientation of the device according to the present disclosure are blocked when the screw is tightened in the door.

In another form, the hollow body is made of a metallic material such as iron or aluminum alloys, stainless steel or cast iron.

In yet another form, the device according to the present disclosure further includes a hollow protection part arranged at the proximal end of the body relative to the threaded end of the screw and configured to protect the interface between the door and the body.

In one form, the protection part is made of a material softer than the body such as PTFE (Polytetrafluoroethylene).

In another form, the protection part is fixed to the proximal end of the body by a complementary shape.

The present disclosure further concerns a lifting tooling for an aircraft component, such as a nacelle thrust reverser door, including a device according to the present disclosure as described above.

In one form, the tooling includes a frame comprising at least three hollow tubular branches. Each branch comprising a first end and a second end opposite the first end. The branches being interconnected by their first end, and a device as described above being housed in the second end of each branch.

More particularly, a device as described above is housed in the second end of each branch by its distal end.

Although the present disclosure is described with regard to lifting tooling for a thrust reverser door, it is not limited to that. Indeed, the device of the present disclosure can be adapted to the fixing of a lifting tooling on any other element such as for example a motor, or even to the fixing of any handling or support tooling on an element of an aircraft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
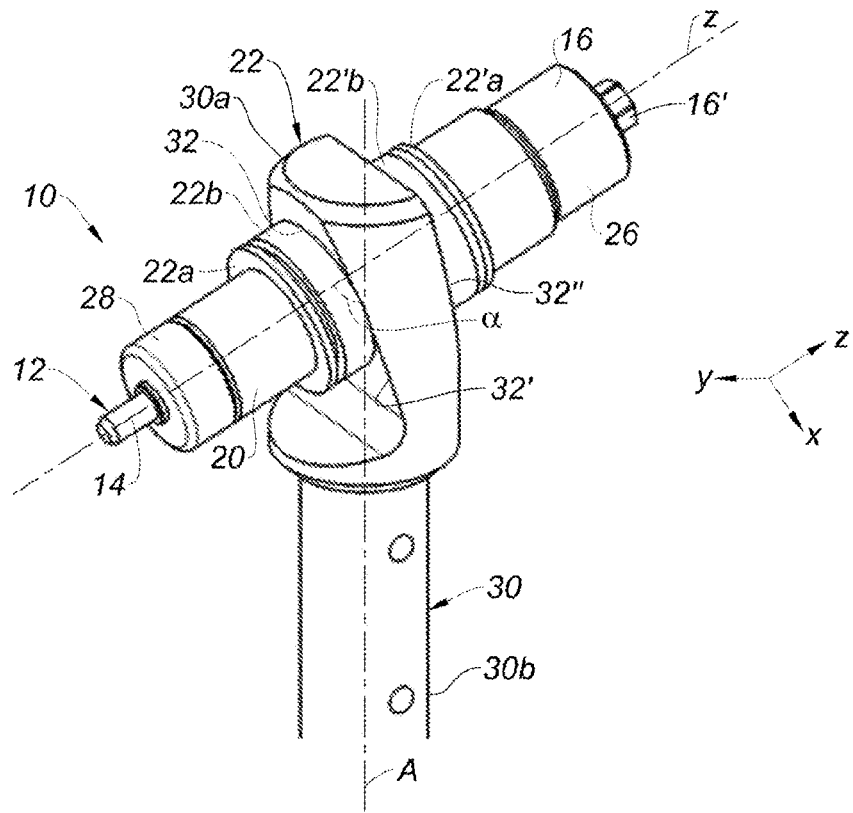
FIG. 1 is a perspective view of a device for fixing a lifting tooling according to the present disclosure, the device including a screw in a projecting position.

In the following description and in the claims, identical, similar or analogous components will be designated by the same reference numerals and we will use the terms "front," "rear," "horizontal," "vertical," "upper," "lower," etc. without limitation and with reference to the drawings in order to facilitate the description.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
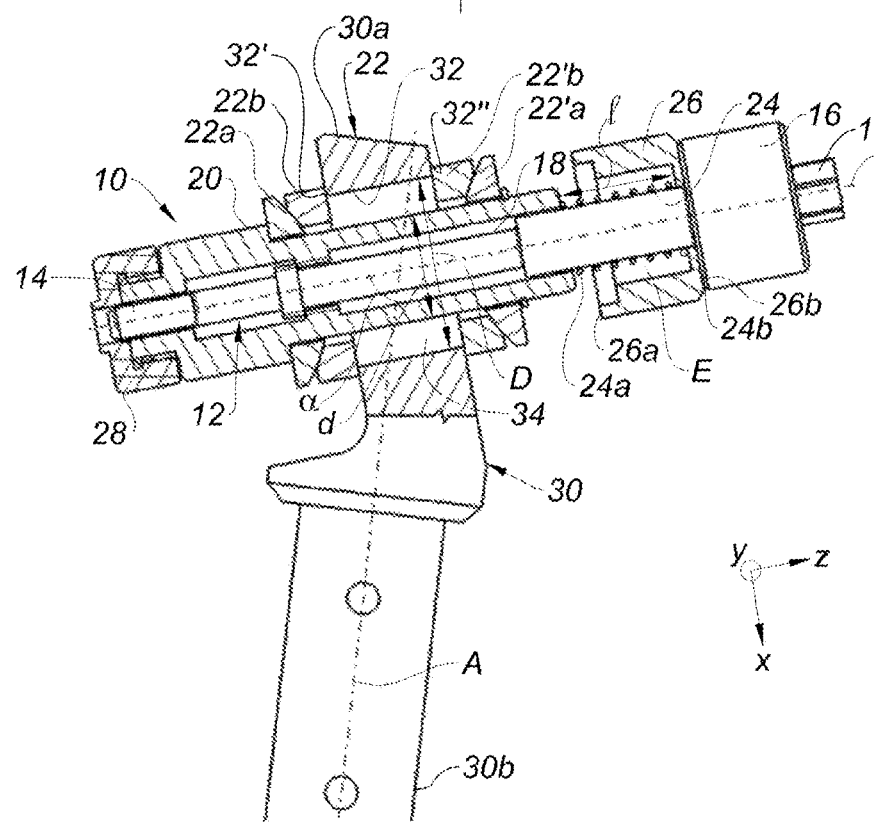
FIG. 2 is a cross-sectional view of the device of FIG. 1 with the screw being in a retracted position.
Figure 3:
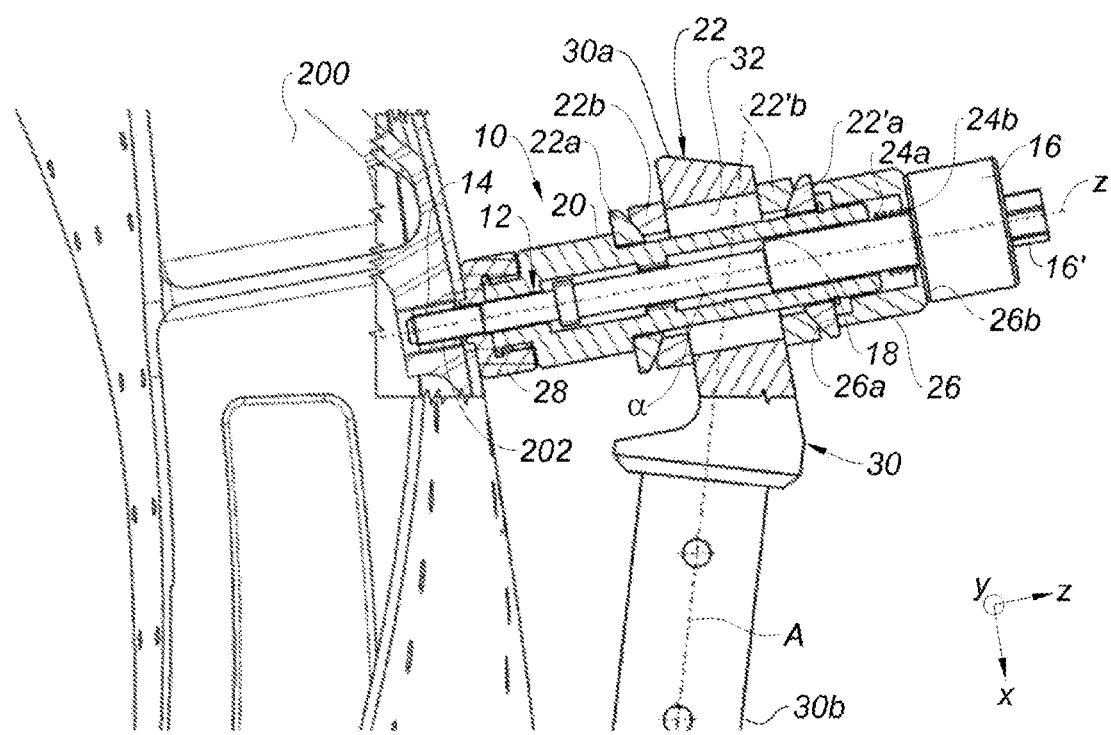
FIG. 3 is a cross-sectional view of the device of FIG. 1 with the screw being in the projecting position and inserted into a door.

With reference to FIGS. 1-4, a device 10 is illustrated for fixing a lifting tooling 100 (FIG. 4) on an element such as a thrust reverser door 200 (FIG. 3). The device 10 includes a threaded screw 12 having a longitudinal axis "z." The screw 12 is housed in a metal hollow body 20. The screw 12 and the body 20 have a longitudinal axis "z."

The device 10 further includes a system 22 for orienting and positioning the screw 12 allowing the rotation of the screw 12 about any axis transverse to the longitudinal axis "z" of the screw 12, and the translation of the screw 12 in any direction perpendicular to its longitudinal axis "z."

Figure 4:
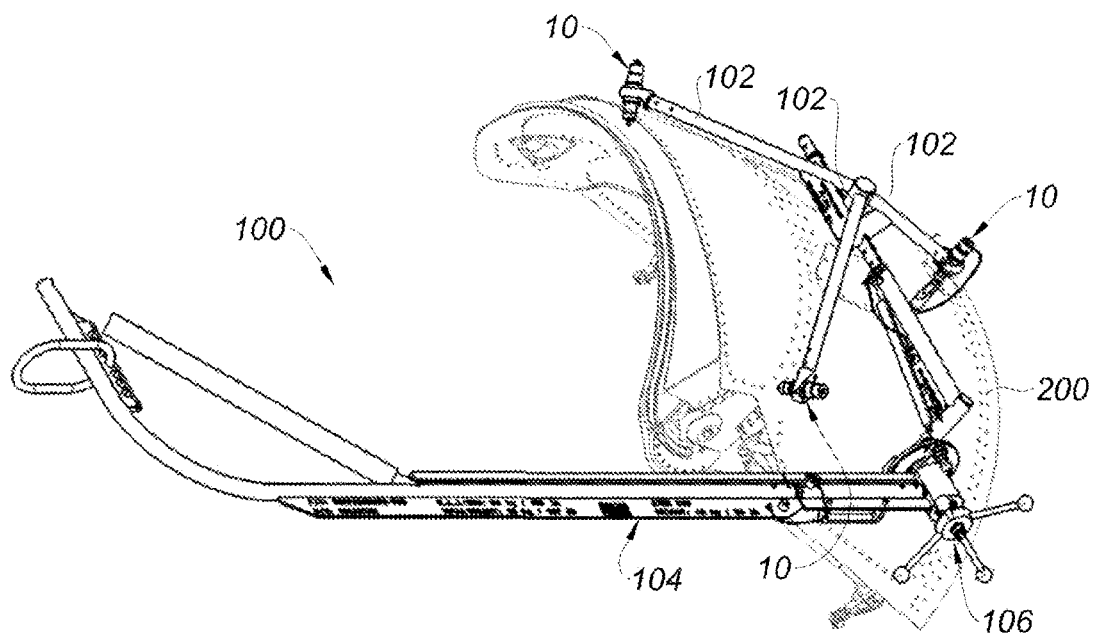
FIG. 4 is a perspective view of a door lifting tooling fixed to a door using devices according to the present disclosure.

The screw orientation and positioning system 22 includes a tubular element 30 having an axis of extension A and including a proximal end 30a with an oblong transverse bore 32 in which the screw 12 is inserted, and a distal end 30b configured to be fixed to the lifting tooling 100 (FIG. 4). The screw 12 is inserted into the oblong transverse bore 32, so that the longitudinal axis "z" of the screw 12 and the extension axis A of the tubular element 30 form an angle α in the range of 25°, the angle α being able to be adjustable between 10 and 40° and in particular between 20 and 30°.

It will be understood that the angle α can take any value between 10 and 40°. By way of example, the angle α is 15°. In another example, the angle α is 30°.

The screw orientation and positioning system 22 further includes a proximal pair of convex and concave washers 22a, 22b, and a distal pair of convex and concave washers 22'a, 22'b. Each pair being placed in contact with the hollow body 20 and outer walls 32', 32" of the oblong transverse bore 32 of the tubular element 30 on each side of said bore 32.

In the remainder of the description, the device of the present disclosure will be described with regard to a device for fixing a lifting tooling for a thrust reverser door, although it can be adapted for fixing a lifting tooling for any other element.

The threaded screw 12 has a threaded proximal end 14 configured to be introduced into an orifice 202 of a thrust reverser door (FIG. 3), a distal end 16 having the shape of a screw head, and an intermediate part 18 (FIG. 2).

The distal end 16 is knurled so as to allow manual tightening. It also includes a protuberance 16' in the longitudinal direction of the screw allowing mechanical clamping using a tool.

In the example of FIG. 1, the threaded proximal end 14 of the screw 12 is projecting from the hollow body 20 so as to allow its introduction into an orifice 202 (FIG. 3). The distal end 16 is also projecting from the hollow body 20 so as to allow the gripping of the distal end 16 by a user for adjusting the position and orientation of the screw, and for rotating it about its longitudinal axis "z" in order to introduce it into (screwing) or remove it from an (unscrewing) orifice of a thrust reverser door, as illustrated in FIG. 3. The adjustment of the position and orientation of the screw will be described below with regard to FIG. 2.

The screw 12 is inserted into the oblong transverse bore 32, so that a portion of its intermediate part 18 (FIG. 2) is disposed in the oblong transverse bore 32.

The length of the portion of the intermediate part 18 (FIG. 2) disposed in the oblong transverse bore 32 is in the range of one third of the total length of the intermediate part.

The proximal pair of convex and concave washers 22a, 22b is disposed near the threaded end 14 of the screw 12, and the distal pair of convex and concave washers 22'a, 22'b is disposed near the distal end 16. The concave washers 22b, 22'b of each pair are placed in contact with the outer walls 32', 32" of the bore 32 and the convex washers 22a, 22'a of each pair are placed in contact with the hollow body 20 (FIG. 2). More particularly, the convex washers 22a, 22'a of each pair are held by an element allowing the washers to be clipped, called circlip, the circlip being inserted in a notch provided in the hollow body 20.

In addition, the device 10 includes a system for retracting the threaded proximal end 14 of the screw 12 in the hollow body 20. This retraction system includes a spring 24 (FIG. 2) and a spacer 26. It will be described below with regard to FIG. 2.

Finally, a hollow protection part 28 is disposed at the proximal end of the hollow body 20 in order to protect the interface between the door 200 (FIG. 3) and the device 10 of the hollow body 20 which is metallic. The protection part 28 is made of PTFE (Polytetrafluoroethylene). It is attached to the proximal end of the body by a complementary shape, as illustrated in FIG. 2.

FIG. 2 illustrates the device 10 of FIG. 1 in a cross-section with the screw 12 being in the retracted position in the hollow body 20.

The threaded end 14 and the intermediate part 18 of the screw 12 are housed in part in the hollow body 20. The outer diameter of the intermediate part 18 and the thread end 14 of the screw 12 is substantially less than the inner diameter of the hollow body 20. So as to allow the rotation of the threaded screw 12 about its longitudinal axis "z." However, the outside diameter of the distal end 16 is greater than the inner diameter of the hollow body 20, so that the distal end 16 is accessible by the user so as to allow the gripping of the screw 12 and its manual rotation, and so as to provide flat support to the spring 24 and to the spacer 26.

The protection part 28 is fixed to the proximal end of the hollow body 20 by complementary shape so as to envelop the part of the threaded end 14 not housed in the hollow body 20. Thus, the screw 12 is in the retracted position in the hollow body 20 and the protection part 28.

The spring 24 of the retraction system is disposed between the hollow body 20 and the distal end 16, so that the intermediate part 18 of the screw 12 is disposed in the spring 24 at its end proximal to the distal end 16. The spring 24 includes a proximal end 24a bearing on the hollow body 20, and a distal end 24b bearing on the distal end 16 via the spacer 26.

In this retracted position, the spring 24 is in an extended position, close to its relaxed position. We are in the tooling approach phase. It pushes back the distal end 16 in the direction opposite to the hollow body 20, via the spacer 26, so that the distal end 16 is spaced from the hollow body 20 by a space E and the threaded end 14 of the screw 12 is retracted into the hollow body 20 and the protection part 28. The space E has a length "l" slightly less than the length of the spring 24 in its rest (relaxed) position, in the range of 27 mm.

As will be seen with regard to FIG. 3, when the device 10 is positioned in contact with an orifice 202 into which it is configured to be introduced, the spring 24 is capable of being compressed by application of a force, manually or using a fixing key, on the distal end 16, allowing the introduction of the threaded end 14 in the orifice 202, that is to say the screwing.

The spacer 26 is disposed between the distal end 16 and the hollow body 20 and has a free proximal end 26a and a distal end 26b secured to the distal end 16. As will be seen with regard to FIG. 3, the spacer 26 has a shape making it possible to make the connection between the distal end 16 and the screw orientation and positioning system 22, and more precisely with the distal pair of convex and concave washers 22'a, 22'b, and therefore to block any movement of the screw 12 when the latter is projecting into a door orifice.

In a non-represented variant, it is the convex washers 22a, 22'a of each pair of convex and concave washers which are in contact with the outer walls 32', 32" of the bore 32.

In another non-represented variant, the distal pair of convex and concave washers 22'a, 22'b includes the concave washer 22'b in contact with the outer walls 32', 32" of the bore 32, while the proximal pair of convex and concave washers 22a, 22b includes the convex washer 22a in contact with the outer walls 32', 32" of the bore 32.

In yet another variant, the distal pair of convex and concave washers 22'a, 22'b includes the convex washer 22'a in contact with the outer walls 32', 32" of the bore 32, while the proximal pair of convex and concave washers 22a, 22b includes the concave washer 22b in contact with the outer walls 32', 32" of the bore 32.

FIG. 2 further shows that a clearance 34 is present in the oblong transverse bore 32, between the inner wall of the bore 32 and the hollow body 20. The diameter "d" of the hollow body 20 disposed in the oblong transverse bore 32 is in the range of 24 mm, while the diameter D of the oblong transverse bore 32 in its most large dimension is in the range of 40 mm. In the configuration of FIG. 2, the hollow body 20 is arranged in the center of the bore 32. In the plane of the device 10, that is to say in the largest dimension of the bore 32. The dimensions of the clearance 34 are therefore of the range of 8 mm on each side of the hollow body 20. This clearance makes it possible to adjust the positioning of the screw 12 by translation along the axis "x" transverse to the longitudinal axis "z" of the screw in the plane of the device 10, as will be seen later with regard to FIGS. 5 and 6.

Furthermore, as will be seen later with regard to FIG. 7, the clearance 34 also makes it possible to adjust the positioning of the screw 12 by translation along the axis "y" transverse to the longitudinal axis "z" of the screw, in a plane transverse to the plane of the device 10.

The free proximal end 26a of the spacer 26 allows the mobility of the screw 12 to allow its positioning by translation in any direction perpendicular to its longitudinal axis "z" in the oblong transverse bore 32, its orientation by varying the angle α between the longitudinal axis "z" of the screw 12 and the extension axis A of the tubular element 30, and its rotation about its longitudinal axis "z."

The spacer 26 not being blocked and bearing against the distal pair of convex and concave washers 22'a, 22'b allows the user to modify the position and the orientation of the screw 12.

The modification of the position and the orientation of the screw 12 makes it possible to adapt the lifting tooling 100 (FIG. 4) to doors of different dimensions and of different shapes, the positions of the orifices 202 being different from one door to another.

In a non-represented variant, the device 10 for fixing a lifting tooling 100 does not include a protection part 28. In this variant, the threaded end 14 of the screw 12 is entirely housed in the hollow body 20 when the screw 12 is in the retracted position.

FIG. 3 illustrates the device 10 of FIG. 2 with the screw 12 being positioned projecting in an orifice 202 of the door 200 of the thrust reverser.

The spring 24 is represented in the compressed position in FIG. 3, the threaded proximal end 14 of the screw 12 projecting from the hollow body 20 and disposed in the orifice 202 of the door 200. In this compressed position, the space E has a length "l" corresponding to the length of the compressed spring, in the range of 9 mm.

In this configuration, the mobility of the screw 12 is fixed by the tension induced by the distal end 16 resting on the spacer 26, itself resting on the distal pair of convex and concave washers 22'a, 22'b.

FIG. 4 illustrates a lifting tooling 100 of a door 200 fixed to a door 200 by means of devices 10 according to the present disclosure.

The tooling 100 includes a frame including three branches 102 interconnected by one end and each including a device 10 as described above at their opposite end, as well as a lifting system 104 allowing the door 200 to perform horizontal and vertical movements via a hoist (not represented) and a crank 106 allowing the door 200 to perform rotational movements.

Figure 5:
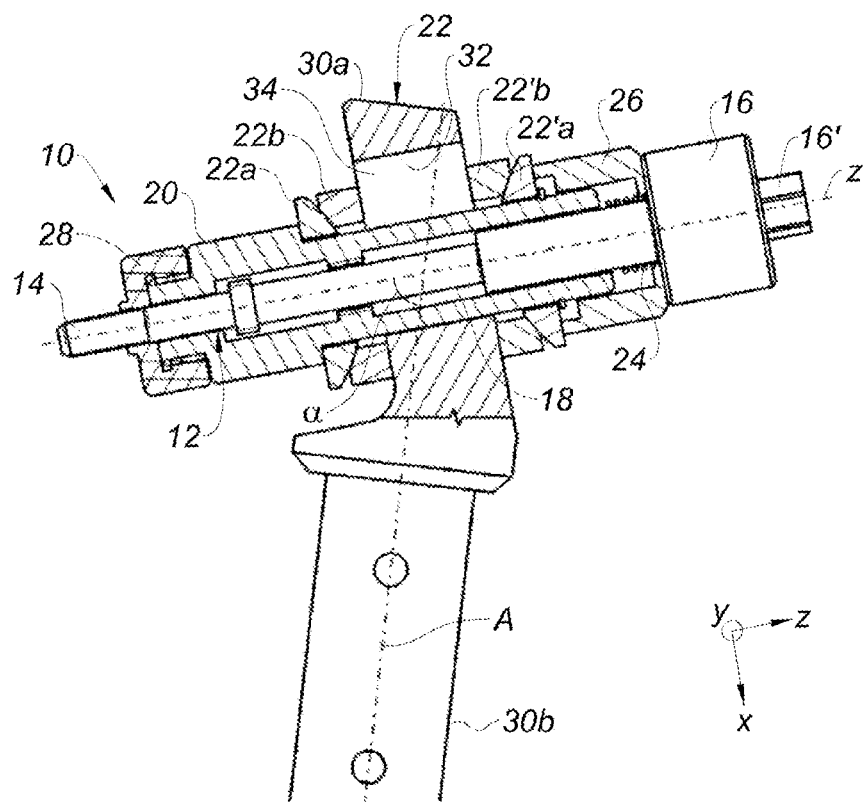
FIG. 5 is a cross-sectional view of the device of FIG. 1 illustrating a first variant of the positioning of the screw by translation parallel to its longitudinal axis.

FIG. 5 illustrates the device 10 of FIG. 1, in a cross-sectional view, the screw 12 being positioned closest to the inner wall of the bore 32, close to the distal end 30b of the tubular element 30. In this configuration, the hollow body 20 is placed in contact with the inner wall of the bore, near the distal end 30b of the tubular element 30. In the plane of the device 10, that is to say in the largest dimension of the bore 32, the dimensions of the clearance 34 are therefore in the range of 16 mm between the hollow body 20 and the inner wall of the bore 32 near the proximal end 30a of the tubular element 30.

Figure 6:
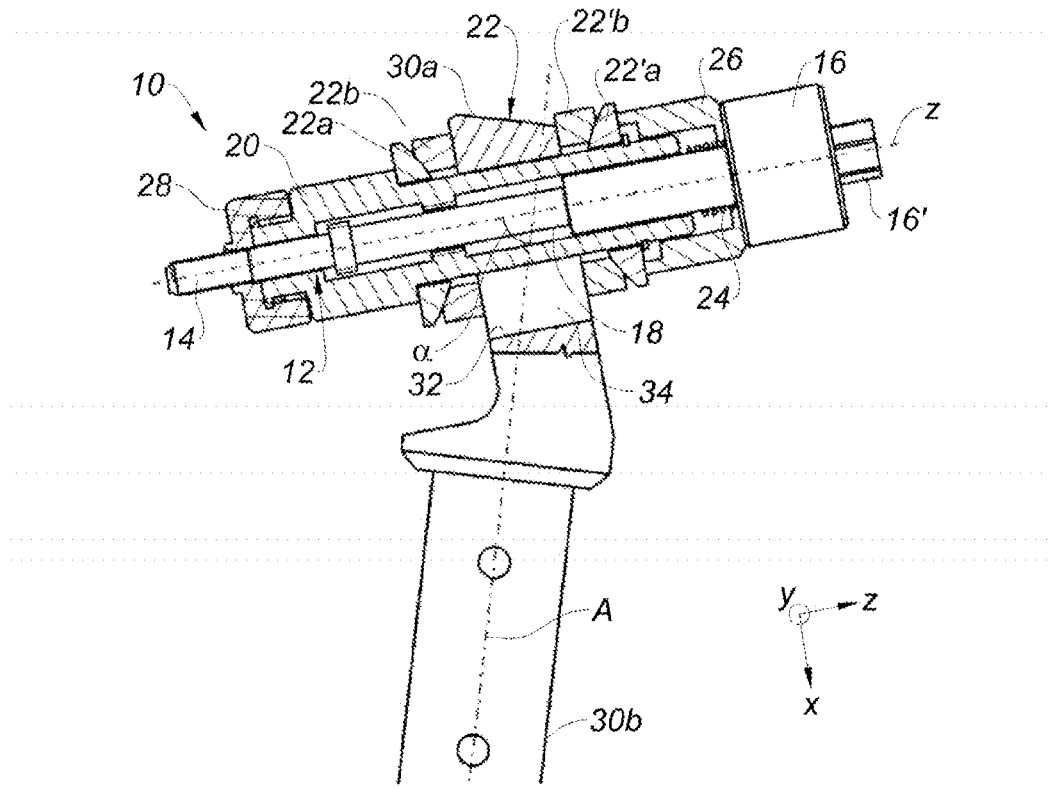
FIG. 6 is a cross-sectional view of the device of FIG. 1 illustrating a second variant of positioning the screw by translation parallel to its longitudinal axis.

In another example, FIG. 6 illustrates the device 10 of FIG. 1, in a cross-sectional view, the screw 12 being positioned as close as possible to the inner wall of the bore 32, close to the end 30a of the tubular element 30. In this configuration, the hollow body 20 is placed in contact with the inner wall of the bore, near the proximal end 30a of the tubular element 30. In the plane of the device 10, that is to say in the largest dimension of the bore 32, the dimensions of the clearance 34 are therefore in the range of 16 mm between the hollow body 20 and the inner wall of the bore 32 near the distal end 30b of the tubular element 30.

Figure 7:
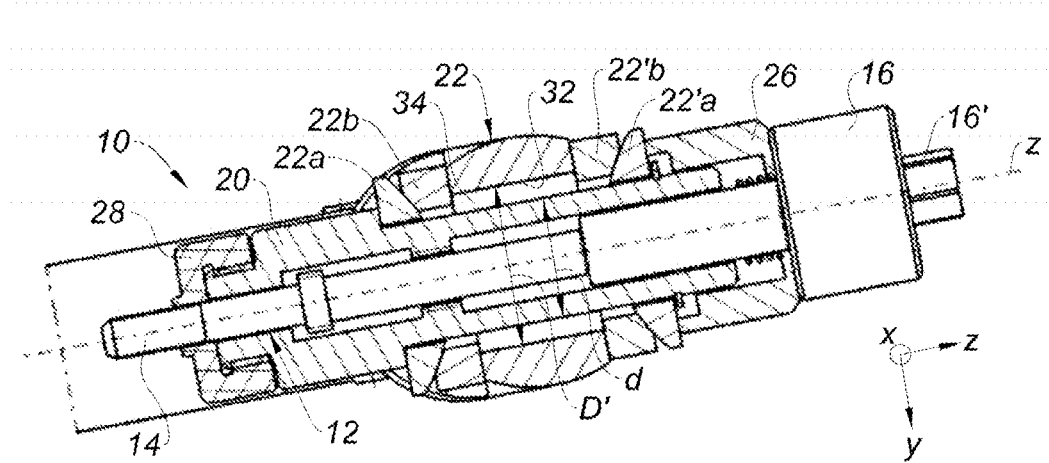
FIG. 7 is a cross-sectional view of the device of FIG. 1.

FIG. 7 illustrates the device 10 of FIG. 1, in a cross-sectional view along the plane transverse to the plane of the device 10, seen from above. This figure shows that the diameter D' of the oblong transverse bore 32 in its smallest dimension is in the range of 32 mm. The outer diameter "d" of the hollow body 20 is of the range of 24 mm. In the configuration of FIG. 7, the hollow body 20 is disposed in the center of the bore 32. In the plane transverse to the plane of the device 10, that is to say in the smallest dimension of the bore 32, the dimensions of the clearance 34 are therefore in the range of 8 mm on each side of the hollow body 20. As indicated above, this clearance makes it possible to adjust the positioning of the screw 12 by translation along any axis transverse to the longitudinal axis "z" of the screw. More particularly, as represented in FIG. 7, this clearance makes it possible to adjust the positioning of the screw 12 by translation along the axis "y" transverse to the longitudinal axis "z" of the screw, in a plane perpendicular to the plane of the device 10. This adjustment is similar to the adjustment described with reference to FIGS. 5 and 6.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for fixing a lifting tooling on an aircraft component, the device including:
   a threaded screw having a longitudinal axis and including a distal end having a screw head, the threaded screw further including a threaded proximal end and an intermediate part;
   a hollow body housing the threaded screw while allowing rotation of the threaded screw along its longitudinal axis;
   an orientation and positioning system configured to allow rotation of the threaded screw about axes transverse to the longitudinal axis of the threaded screw, and translation of the threaded screw parallel to its longitudinal axis; and
   a retraction system configured to retract the threaded proximal end of the threaded screw in the hollow body.

2. The device according to claim 1, wherein the retraction system includes a spring and a spacer, the spring being disposed between the hollow body and the screw head, the spring comprising a proximal end bearing on the hollow body and a distal end bearing on the screw head via the spacer, the spacer having a shape allowing connection between the screw head and the orientation and positioning system when the threaded screw is projecting in an orifice of the aircraft component.

3. The device according to claim 1, wherein the orientation and positioning system includes:
a tubular element including a proximal end with an oblong transverse bore in which the threaded screw is inserted, and a distal end configured to be attached to the lifting tooling; and
a ball joint system in contact with the hollow body and outer walls of the oblong transverse bore of the tubular element.

4. The device according to claim 3, wherein an outer diameter of the hollow body is less than a diameter of the oblong transverse bore, so that a clearance is present between an inner wall of the oblong transverse bore and the hollow body inserted in the oblong transverse bore.

5. The device according to claim 3, wherein the ball joint system comprises a proximal pair of convex and concave washers, and a distal pair of convex and concave washers, each of the proximal and distal pair of convex and concave washers being disposed in contact with the outer walls of the oblong transverse bore of the tubular element and the hollow body, on each side of the oblong transverse bore of the tubular element.

6. The device according to claim 3, wherein the ball joint system comprises at least a pair of convex and concave washers.

7. The device according to claim 6, wherein the ball joint system is arranged in contact with the outer walls of the oblong transverse bore of the tubular element and of the hollow body, so that the threaded screw is allowed to pivot on itself and about any axis transverse to the longitudinal axis.

8. The device according to claim 1, wherein the hollow body is made of a metallic material.

9. The device according to claim 1, further comprising a hollow protection part disposed at a proximal end of the hollow body relative to the threaded proximal end of the threaded screw and configured to protect an interface between the aircraft component and the hollow body.

10. The device according to claim 9, wherein the hollow protection part is made of Polytetrafluoroethylene (PTFE).

11. The device according to claim 9, wherein the hollow protection part is made of a material softer than the hollow body.

12. The device according to claim 1, wherein the hollow body is made of iron alloy, aluminum alloy, stainless steel or cast iron.

13. A lifting tooling for an aircraft component comprising a device according to claim 1.

14. The lifting tooling according to claim 13, further comprising a frame comprising at least three hollow tubular branches, each hollow tubular branch comprising a first end and a second end opposite the first end, the at least three hollow tubular branches being interconnected at the first end, and a device according to claim 1 being housed in the second end of each hollow tubular branch.

15. A device for fixing a lifting tooling on an aircraft component, the device including:
a threaded screw having a longitudinal axis and including a distal end having a screw head, the threaded screw further including a threaded proximal end and an intermediate part;
a hollow body housing the threaded screw while allowing rotation of the threaded screw along its longitudinal axis;
an orientation and positioning system configured to allow rotation of the threaded screw about axes transverse to the longitudinal axis of the threaded screw, and translation of the threaded screw parallel to its longitudinal axis, the orientation and positioning system including a tubular element with a proximal end and a distal end, the proximal end defining a bore to receive the threaded screw and a distal end configured to be attached to the lifting tooling; and
a retraction system configured to retract the threaded proximal end of the threaded screw in the hollow body.

16. A lifting tooling for an aircraft component comprising:
a device including a threaded screw having a longitudinal axis and including a distal end having a screw head, the threaded screw further including a threaded proximal end and an intermediate part, a hollow body housing the threaded screw while allowing rotation of the threaded screw along its longitudinal axis, an orientation and positioning system configured to allow rotation of the threaded screw about axes transverse to the longitudinal axis of the threaded screw and translation of the threaded screw parallel to its longitudinal axis, and a retraction system configured to retract the threaded proximal end of the threaded screw in the hollow body; and
a frame including at least one hollow tubular branch having a first end and a second end opposite the first end, and the device is housed within the second end of the at least one tubular branch.

* * * * *